No. 615,121. Patented Nov. 29, 1898.
R. WITTMANN.
VESSEL OR KETTLE TILTER.
(Application filed Nov. 22, 1897.)

(No Model.)

Witnesses.
O. H. Keeney
Anna V. Faust

Inventor.
Rudolph Wittmann.
By Benedict and Morsell
Attorneys.

THE NORRIS PETERS CO., PHOTO-LITHO., WASHINGTON, D. C.

UNITED STATES PATENT OFFICE.

RUDOLPH WITTMANN, OF MILWAUKEE, WISCONSIN.

VESSEL OR KETTLE TILTER.

SPECIFICATION forming part of Letters Patent No. 615,121, dated November 29, 1898.

Application filed November 22, 1897. Serial No. 659,392. (No model.)

*To all whom it may concern:*

Be it known that I, RUDOLPH WITTMANN, of Milwaukee, in the county of Milwaukee and State of Wisconsin, have invented a new and useful Improvement in Vessel or Kettle Tilters, of which the following is a description, reference being had to the accompanying drawings, which are a part of this specification.

My invention relates to improvements in vessel or kettle tilters.

It relates to that class of devices for tilting vessels—for instance, culinary vessels or kettles—wherein it is desirable to be able to tilt the utensil in such manner as to avoid scalding the hands when drawing off the water after boiling vegetables, meats, &c.

The object of my invention is to provide a construction of device of the above character in which an improved form of swivel for the bail is provided and in which also simplicity and cheapness of construction are predominant features.

With the above primary and other objects in view the invention consists of the devices and parts or their equivalents, as hereinafter more fully set forth.

Figure 1:
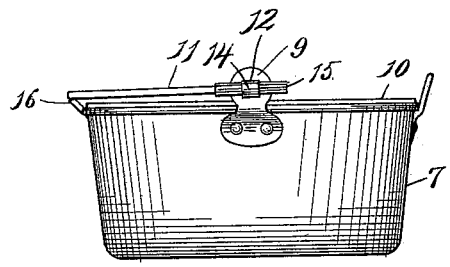
Figure 2:
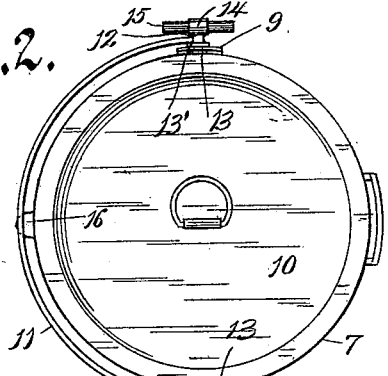

In the accompanying drawings, Figure 1 is a side elevation of a vessel, showing one form of my improvement. Fig. 2 is a plan view of Fig. 1, and Figs. 3, 4, 5, and 6 are plan views of modified forms of the invention.

Figure 3:
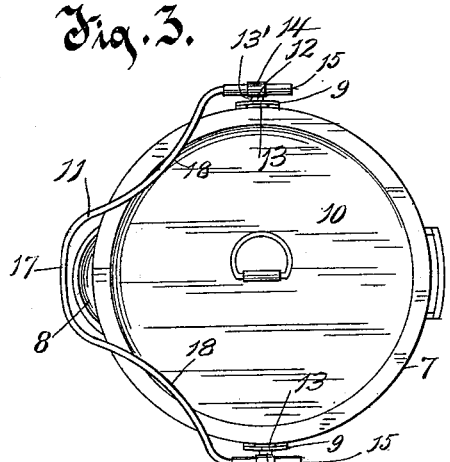
Figure 4:
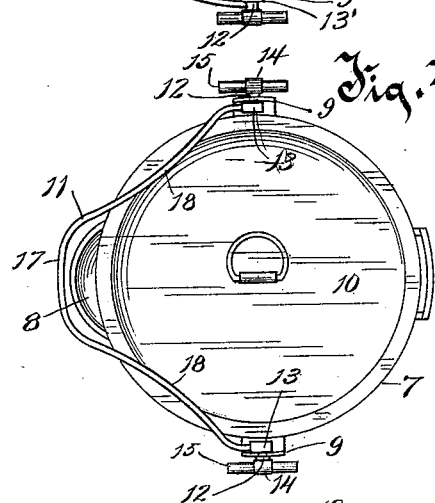

Referring to the drawings, the numeral 7 throughout the several views indicates an ordinary vessel or kettle provided with the usual spout 8, Figs. 3, 4, 5, and 6, and apertured side ears 9 9. The cover of the vessel throughout the several views is indicated by the numeral 10 and the bail by the numeral 11. Pivots, to which the ends of the bail are connected and which pivots form swivel connections with the ears of the vessel, constitute another feature of my invention common to all the figures of the drawings. In the several figures of the drawings these pivots are indicated by the numeral 12, and each consists of a shank portion, which is passed freely through the aperture of an ear 9 and is formed on each side of said ear with shoulders 13 13' to prevent lateral play of the swivel in either direction. The outer end of each swivel is also formed with an eye or sleeved portion 14, arranged in a plane at right angles to the plane of the shank of the swivel. This eye or sleeve is shown in Figs. 1 and 4 as adapted to have fitted tightly therein a handle 15, preferably of some material which will resist the effects of heat, so that a person's hands may be applied to the handles without danger of burning. The bail in Figs. 1 and 2 is preferably struck from the arc of a true circle, and the ends of said bail are made to engage the shanks of the swivel at points removed from the sides of the kettle. The ends of the bail are preferably secured to the shank by being fitted tightly in recesses or openings formed in said shanks. The vessel is also provided with a projecting lip 16. The drawings show the bail as turned down, and when in this position it will be seen that the forward portion of the bail is supported by the lip 16. This lip, therefore, forms a bearing-point against which the bail rests, so that the vessel may be tilted when the handles are grasped. If no support for the bail was provided, it is obvious that forward pressure on the handles would have no effect whatever, or, in other words, no pressure would be exerted on the vessel, so as to tilt the same.

In the operation of tilting the vessel the handles are first grasped, and as said vessel is tilted the bail is pressed over by reason of the free turning of the swivels in their bearings, so that the forward end of said bail will engage the projecting lip of the kettle.

In all the forms of construction excepting that illustrated in Figs. 1 and 2 I have shown the kettle as unprovided with the projecting lip for holding the bail above the discharging hot liquid, and in lieu thereof form the bail with inward projections, which extend to points well within the diameter of the cover, as indicated at 18 18, whereby when the bail is turned down there is a pressure on the kettle and the kettle is thereby tilted, while the cover at the same time is held firmly in place.

In all the other figures of the drawings excepting in Figs. 1 and 2 I also show the bail as provided with a forward projection 17, which when the bail is turned down is adapted to project beyond the spout for some distance, whereby it is out of the line of the discharging liquid, and is thereby prevented from becoming too hot for handling by a person when it is desired to lift the vessel.

In the Fig.-3 form of construction the ends of the bail instead of connecting directly to the shanks of the swivels are shown as passing into the handles 15.

Fig. 4 illustrates the ends of the bail as extending into the inner shoulders 13 of the shanks of the swivels.

Figure 5:
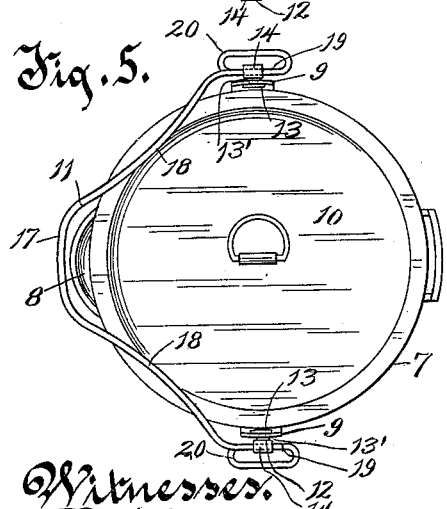

Fig. 5 shows a form of construction in which the bail is adapted to have a back-and-forth sliding motion and in which also the handles 15 are omitted. At opposite ends the bails are formed with straight extensions 19 19, which pass freely through the eyed portions of the swivels, and the extremities of the bails are then bent around in the form of loops 20 20 to constitute handles. This arrangement presents an advantage, inasmuch as when it is desired to nest the kettles, or place one within the other for compactness in shipping, the bail can be thrust forward, so as not to interfere with the free insertion of one kettle within the other. It also possesses a further advantage, inasmuch as it can be thrust so far forwardly as to insure against any of the hot liquid striking the bail in the act of pouring out the contents of the kettle. The shape of the bail illustrated in Figs. 1 and 2, in which the bail is shown as in the arc of a circle, also permits the vessels to be nested or placed one within the other for compactness in shipment.

Figure 6:
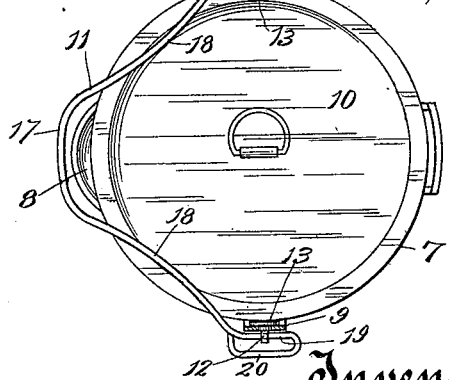

In the construction illustrated in Fig. 6 the bail is of the same form as that shown in Fig. 5, excepting that the sleeved portion at the outer end of each swivel is omitted and simply an opening in the shank of the swivel provided for the passage therethrough of the straight extension 19 of the bail. The straight extension 19 can fit tightly in the opening of the shank of the swivel or may extend freely therethrough, so as to have a sliding movement, as in the case of Fig. 5. The straight extension, Fig. 6, also bears directly against the outer side of the ear 9, and consequently takes the place of the outer shoulder 13'.

While I have herein described the shank of each swivel as provided with an outer shoulder 13', bearing against the outer side of the ear 9, yet this shoulder 13' is not absolutely necessary, as merely the shoulder 13 could be provided. The shoulder 13', however, forms a better construction and holds the swivel in its bearing without any lateral movement either outward or inward.

From the above description it is thought that the advantages of my invention will be readily appreciated. The provision of the separate swivel for the connection thereto of the ends of the bail is an important feature, inasmuch as it dispenses with the necessity of passing the ends of the bail directly through the eyes of the ears, and consequently constant wear directly on the bail at the pivotal points is avoided. It also provides a neat and enduring construction and one which admits of the bail and swivel being sold separately for application by a dealer direct to the vessel, inasmuch as in the manufacture the inner shoulder could be omitted and the dealer thereby enabled to insert the shanks of the swivels into the bearings of the vessel and subsequently upset the inner ends of said shanks to form the inner shoulders 13.

What I claim as my invention is—

1. The combination, of a vessel, formed or provided with bearings, swivels adapted to turn in the bearings, handles formed with or connected to the swivels and adapted to turn therewith, and a bail adapted to bear on the vessel, and having its ends non-integral with the swivels, but connected so as to turn with said swivels.

2. The combination, of a vessel formed or provided with bearings, swivels adapted to turn in the bearings, said swivels formed or provided at their outer ends with eyed portions, handles fitted in said eyed portions, and a bail having its ends connected so as to turn with the swivels.

3. The combination, of a vessel formed or provided with bearings extending above the body of the vessel, swivels adapted to turn in said bearings, and a bail adapted normally to bear upon the cover of the vessel and having its ends slidingly fitted in the swivels, whereby the bail, when turned down to a horizontal position above the top of the vessel, is capable of having a back-and-forth sliding movement, so as to permit the bail to be slid beyond the rim of the vessel, to provide for nesting one vessel within the other.

4. The combination, of a vessel formed or provided with bearings, swivels adapted to turn in the bearings, said swivels formed or provided with eyed portions, and a bail formed or provided at its ends with handles, each of said handles slidingly fitting the eyed portions of the swivels.

In testimony whereof I affix my signature in presence of two witnesses.

RUDOLPH WITTMANN.

Witnesses:
A. L. MORSELL,
ANNA V. FAUST.